United States Patent Office

2,736,664
Patented Feb. 28, 1956

2,736,664

POLYHYDRIC ALCOHOL ESTERS OF ROSIN AND A TERT-ALKYL BENZOIC ACID AND CELLULOSE COMPOUNDS CONTAINING THEM

Theodore F. Bradley and Roy W. H. Tess, Orinda, Calif., assignors to Shell Development Company, San Francisco, Calif., a corporation of Delaware No Drawing. Application October 21, 1950,
Serial No. 191,502

8 Claims. (Cl. 106—173)

This invention relates to novel mixed polyhydric alcohol esters of tert-alkyl benzoic and rosin acids, and to their utilization in the preparation of improved surface coating compositions containing cellulose compounds.

Specifically, the invention provides new and particularly useful mixed esters comprising a polyhydric alcohol having at least one hydroxyl group esterified with an aromatic monocarboxylic acid which has one of its ring carbon atoms joined to an open chain aliphatic radical which when attached to the said ring contains a quaternary carbon atom, such as tert-butyl benzoic acid, and one or more of the other hydroxyl groups esterified with a rosin acid. The invention further provides coating compositions containing these mixed esters.

It is an object to provide mixed polyhydric alcohol esters of tert-alkyl benzoic acids and rosin which are particularly useful in the preparation of improved coating compositions containing cellulose compounds. It is a further object to provide coating compositions containing the aforedescribed mixed esters which have improved hardness and durability. Other objects and advantages of the invention will be apparent from the following detailed description thereof.

It has now been discovered that these and other objects may be accomplished by mixed esters comprising a polyhydric alcohol having at least one and preferably from 10% to 80% of the hydroxyl groups esterified with an aromatic monocarboxylic acid which has one of its ring carbon atoms joined to an open chain aliphatic radical which when attached to the said ring contains a quaternary carbon atom, and at least one and preferably from 20% to 90% of the other hydroxyl groups esterified with a rosin acid.

The substituted aromatic acids employed in producing novel mixed esters comprise the aromatic monocarboxylic acids having an aromatic nucleus wherein one of the ring carbon atoms of that nucleus is joined to a carboxyl group and another ring carbon atom is joined to an aliphatic open chain radical which when attached to the said ring contains a quaternary carbon atom. The aromatic nucleus may, if desired, be substituted with other substituents, such as halogen atoms, short-chain alkyl radicals, alkoxy radicals, and the like. The aliphatic open-chain radical attached to the aromatic nucleus may be saturated or unsaturated and may be further substituted. Examples of these radicals are tert-butyl, tert-octyl, tert-amyl, tert-hexyl, 1,1,1,-diethylbutyl, 1,1-dimethylpropen-2-yl, 1-methyl-1-ethylhexyl, 1,1-dimethyl-3-chloropropyl, 1,1-dimethyl-3-cyanopropyl, 1,1-ditert-butylamyl, 1,1-diethyl-3-nitrohexyl, and the like.

Illustrative examples of the above-described substituted aromatic acids are p-tert-butylbenzoic acid, p-(1,1-dimethyl-3-chloropropyl) benzoic acid, p-tert-decylbenzoic acid, m-tert-amylbenzoic acid, m-tert-octylbenzoic acid, m-tert-hexyl-p-chlorobenzoic acid, m-tert-butyl-p-tert-amylbenzoic acid, m-ethyl-p-tert-nonylbenzoic acid, 4-tert-butyl-1-naphthoic acid, and m-(1,1-diisobutylhexyl)-benzoic acid.

Preferred acids are those wherein the open-chain aliphatic radical joined to the aromatic ring is a tertiary alkyl radical containing from 4 to 16 carbon atoms, such as p-tert-butylbenzoic acid, m-tert-hexylbenzoic acid, p-tert-dodecylbenzoic acid, m-propyl-p-tert-butylbenzoic acid, and the like.

Coming under special consideration, particularly because of the fine quality of mixed ester produced therefrom, are the aromatic monocarboxylic acids possessing a single aromatic ring wherein one of the ring carbon atoms is joined to a carboxyl group and another ring carbon atom, preferably in the para position thereto, is joined to a tertiary alkyl radical containing from 4 to 12 carbon atoms, and the remaining ring carbon atoms are joined to a member of the group consisting of hydrogen, halogen, and lower alkyl radicals, preferably the straight-chain alkyl radicals containing from 1 to 4 carbon atoms.

The other acids to be reacted with the polyhydric alcohols are the rosin acids. The expression "rosin acids" as used throughout the specification and claims refers to all those acids ordinarily employed in the preparation of ester gums, such as gum or wood rosin, pine oleorosin, pimaric acids, abietic acid, as well as polymerized rosin, disproportionated rosin, hydrogenated rosin and the rosin portions of tall oil.

The polyhydric alcohols may also be esterified with a third acid which includes the lower saturated monocarboxylic acids, such as acetic, propionic, butyric and stearic acid, the saturated polycarboxylic acids, such as malonic, succinic, tartaric, citric and tricarballylic acid, the aromatic polycarboxylic acids as phthalic, isophthalic, terephthalic, chlorophthalic acid, and the unsaturated polycarboxylic acids, such as itaconic, citraconic, aconitic, and the like acids. For the purposes of the present invention, however, it is preferred that not more than about 20% of the hydroxyl groups of the polyhydric alcohol be esterified with this type of acid.

The polyhydric alcohols used in producing the novel mixed esters of the invention are alcohols containing a plurality, e. g., two, three, four or more, esterifiable hydroxyl groups. The alcohols may be monomeric or polymeric, acyclic, alicyclic or heterocyclic and may be further substituted with non-interfering substituents, such as halogen atoms, alkoxy radicals, ester radicals and the like. Examples of the polyhydric alcohols are ethylene glycol, propylene glycol, glycerol, pentaerythritol, polypentaerythritol, polyglycerol, mannitol, sorbitol, dulcitol, inositol, carbohydrates, methyltrimethylolpropane, 1,4,6-octanetriol, butanediol, 1,2,6-hexanetriol, 2,8-dodecanediol, glycerol monoethyl ether, glycerol allyl ether, diethylene glycol, 2 - ethylhexanetriol - 1,2,6, tetrahydroxycyclohexane, 3,3'-thiodipropanol, 4,4'-thiodibutanol, poly(allyl alcohol), poly(vinyl alcohol), poly(methallyl alcohol), and polyols formed by the condensation of bis-phenols with epichlorohydrin, and the like, and mixtures thereof.

Preferred polyhydric alcohols are those containing at least three, and preferably from 3 to 12 hydroxyl groups, such as glycerol pentaerythritol, mannitol, polyglycerol, polypentaerythritol, low molecular weight poly(allyl alcohol) and poly(vinyl alcohol), polyols formed by the condensation of bisphenols with epichlorohydrin, and the like. Particularly preferred alcohols are the aliphatic alcohols containing from 3 to 8 hydroxyl groups and from 3 to 12 carbon atoms.

Coming under special consideration, particularly because of the outstanding properties of their mixed esters in the preparation of coating compositions, are the pentaerythritols, i. e., pentaerythritol, dipentaerythritol, tripentaerythritol, etc., or mixtures thereof such as are obtained by condensing acetaldehyde with formaldehyde.

The mixed esters of the invention are obtained by esterifying at least one hydroxyl group of the above-described polyhydric alcohols with the aforedescribed substituted aromatic acids and one or more of the other hydroxyl groups with the rosin acid. Mixed esters having the improved surface coating properties are generally obtained by esterifying from 10% to 80% of the hydroxyl groups of the polyhydric alcohol with the substituted aromatic acids and from 20% to 90% of the hydroxyl groups with the rosin acid. Outstanding mixed esters are obtained when from 25% to 75% of the hydroxyl groups are esterified with the substituted aromatic acids and substantially all of the remaining hydroxyl groups esterified with the rosin acid. In producing the novel esters, mixtures of the substituted aromatic acids and/or the rosin acids may be employed.

Illustrative examples of the mixed esters of the invention include a rosin acid ester of pentaerythritol tri(tert-butylbenzoate), a rosin acid ester of poly(allyl alcohol) wherein at least three of the hydroxyl groups are sterified with tert-octylbenzoic acid, the rosin acid diester of pentaerythritol di(tert-butylbenzoate), the rosin acid diester of dipentaerythritol di(tert-nonylbenzoate) dibutyrate, and the hydrogenated rosin acid ester of poly(allyl alcohol) having at least three of its hydroxyl groups esterified with tert-butylbenzoic acid.

The mixed esters of the invention may be prepared by any suitable method. They may be prepared, for example, by direct esterification of the polyhydric alcohol with the desired mixture of acids. This may be accomplished by reacting all three of the different types of reactants together at the same time, or by first reacting the polyhydric alcohol with the substituted aromatic acid and then adding the rosin acid, or still further by reacting the polyhydric alcohol with the rosin acid and then reacting the resulting product reacted with the substituted aromatic acid.

Catalysts are generally not necessary for this type of reaction but they may be employed if desired. If the resulting ester is to be used in the preparation of a surface coating composition the use of the catalysts, and particularly the acid acting catalysts, should be avoided. Catalysts that may be used to accelerate the reaction include p-toluenesulfonic acid, ethanesulfonic acid, chloroacetic acid, sulfuric acid, benzenesulfonic acid, formic acid, boron and silicon fluorides, acid salts, such as mono-sodium and mono-potassium sulfates, and salts of strong acids and weak bases, such as aluminum sulfate, zinc chloride, zinc sulfate, and the like. The amount of the catalyst employed will vary over a wide range, depending upon the particular reactants and catalyst selected but in most cases will generally vary between 0.1% to 5% by weight of the reactants.

Another method for preparing the mixed esters comprises an ester-exchange reaction between the polyhydric alcohol or its lower aliphatic acid ester and the lower aliphatic alcohol esters of the substituted aromatic acid and the rosin acid. Ester-exchange catalysts that may be included in this type of reaction include the alkali metal alcoholates, such as sodium and potassium alcoholates; acid catalysts, such as p-toluenesulfonic acid; metals, such as copper, nickel, tin, zinc; and other compounds, such as pyridine, aluminum alkoxides, sodium phenoxide, potassium carbonate, boron fluoride, mercury salts, and the like. The amount of the catalyst used will vary under the different conditions and in most cases will be between 0.01% to 5% by weight of the reactants. Large or smaller amounts may be used, however, if desired or necessary.

Still another method for preparing the mixed esters comprises a combination of the above-described direct esterification process and ester-exchange reactions, e. g., by reacting the polyhydric alcohol with one of the acids and a lower aliphatic alcohol ester of the other type acid.

The amount of the acids, or their lower esters, and the polyhydric alcohol or ester to be employed in the above-described processes will vary over a considerable range, depending upon the type of product desired. In general, one mole of acid or ester should be utilized for every hydroxyl group to be esterified with that particular acid. In many cases, it is desired to employ the acid or lower ester in excess of the calculated quantity.

The esterification may be accomplished in the presence or absence of solvents or diluents. In case solvents or diluents are desired, inert organic compounds, such as benzene, toluene, cyclohexanone, and xylene, and mixtures thereof, are generally the more preferred.

The temperature employed during the esterification may vary over a wide range, depending upon the particular reactants and catalysts employed. In most cases the temperature will range from about 100° C. to about 300° C. with a more preferred range being between 200° C. and 250° C.

To minimize undesired side reactions and to prevent excessive discoloration, it is sometimes desirable to conduct the esterification in the absence of oxygen-containing gases, preferably providing a blanket of an inert gas, such as nitrogen or carbon dioxide.

The water, alcohol or lower ester formed in the reaction may be removed at the time of their formation or at the end of the reaction. The removal may be accomplished by any suitable means comprising distillation, extraction, fractional precipitation, and the like.

The physical state of the resulting mixed esters will depend on the type of reactants and proportions selected. In general, those esters containing the relatively high amounts of the drying oil fatty acids are usually liquid, while those containing the rosin-type acids are usually plastic-type material to solids.

As indicated, the mixed esters of the invention are particularly valuable in the preparation of coating compositions. The mixed esters and particularly those prepared from the rosin acids and drying oil fatty acids may be used directly or in combination with an appropriate thinner or solvent to produce improved coating compositions. Fused driers, such as the metallic resinates, linoleates and naphthenates, are preferred; however, other driers as litharge, lead acetate, lead carbonate, manganese borate and the like may also be added to such compositions.

The mixed esters of the invention may also be combined with additional quantities of drying oils, such as tung oil, linseed oil, dehydrated castor oil, soybean oil, and the like, and with or without appropriate solvents and driers to form varnishes having improved characteristics, particularly increased hardness, durability and improved resistance to water and alkali.

The novel mixed esters may also be employed in combination with other film-forming materials, such as the cellulose derivatives, vinyl-type polymers and aldehyde type condensation resins. Aldehydes used in producing resins of this latter type may be exemplified by formaldehyde or compounds engendering formaldehyde, acetaldehyde, propionaldehyde, butyraldehyde, acrolein, methacrolein, benzaldehyde, furfural, etc., mixtures thereof or mixtures of formaldehyde with such compounds. The materials condensed with the aldehydes may be exemplified by phenols, urea, thiourea, diurea, hydroxy urea, ethanol urea, diethylene triurea, methyl urea, acetyl urea, phenyl thiourea, methylene urea, guanidine, dicyandiamide, melamine, and the like, and mixtures thereof.

The vinyl-type polymers that may be combined with the novel esters in producing the improved surface coating compositions comprise the polymers of the monomers containing at least one $CH_2\!=\!C\!=\!$. Examples of these monomers are styrene, alpha-methylstyrene, dichlorostyrene, vinyl phenol acrylic acid and the alpha-alkyl substituted acrylic acids, the esters of these unsaturated acids, such as methyl acrylate, methyl methacrylate, butyl methacrylate, the vinylidene halides, the vinyl esters of the inorganic acids, such as the halogen acids and hydrocyanic acid, as vinyl chloride, vinyl bromide, acrylonitrile, and methacrylonitrile, the vinyl esters of the monocarboxylic acids, such as vinyl acetate, vinyl chloroacetate, vinyl benzoate, and vinyl caproate, the vinyl esters of the polycarboxylic acids, such as divinyl succinate, divinyl adipate, vinyl methyl glutarate, the vinyl esters of the unsaturated acids, such as vinyl acrylate, vinyl crotonate, and the like, and mixtures thereof.

The novel mixed esters are especially valuable as additives for coating compositions containing cellulose derivatives. Such derivatives may be exemplified by cellulose nitrate, cellulose acetate, cellulose propionate, cellulose stearate and cellulose valerate; ethyl cellulose, methyl cellulose, butyl cellulose, benzyl cellulose, glycol cellulose, cellulose acetostearate, cellulose acetotartarate, and the like, and mixtures thereof.

To illustrate the manner in which the invention may be carried out the following examples are given. It is to be undersoood, however, that the examples are for the purpose of illustration and the invention is not to be regarded as limited to any of the specific reactants or conditions recited therein. Unless otherwise specified, parts described in the examples are parts by weight.

*Example I*

A mixture comprising 150 parts of pentaerythritol, 524 parts of p-tert-butylbenzoic acid and 326 parts of WW wood rosin was heated upwards to 250° C. for three hours, held at 250° C. for one and a quarter hours and then at 275° C. for six hours. The resulting ester had an acid number of 10.1, rosin color of N, Gardner color of 9.0, and softening point (ring and ball method) of 203° F. (95° C.).

A varnish having improved properties was prepared from the above-described mixed ester by mixing 113 parts of the same with 223 parts of tung oil in an open stainless steel kettle equipped with stirrer and carbon dioxide bubbler, heating the mixture to 500° F. in 37 minutes and holding it at that temperature for 10 minutes, and then cooling to 350° F. and diluting with an aromatic concentrate. The resulting varnish had a Gardner color of 10—11, viscosity F–G (Gardner Holdt), and contained 50.7% solids.

The above-described mixed ester was also soluble in acetone, toluene and n-butyl acetate and compatible with vinylite VAGH, Parlon, ethyl cellulose and nitrocellulose. In combination with nitrocellulose, the ester produces lacquers which form very hard and durable films.

Esters having related properties are obtained by replacing pentaerythritol in the aforedescribed process with dipentaerythritol and tripentaerythritol, and by replacing the WW wood rosin with hydrogenated rosin and polymerized rosin.

*Example II*

A mixture comprising about 350 parts of poly(allyl alcohol) containing at least 5 hydroxyl groups, 350 parts of tert-butylbenzoic acid, 400 parts of linseed oil fatty acids and 100 parts of WW wood rosin is heated in a closed all-glass apparatus upwards to 250° C. for three hours and held at that temperature for several more hours. Carbon dioxide is slowly bubbled through the reaction mixture during the esterification. The resulting ester is diluted with a volatile hydrocarbon solvent and the mixture applied to clean steel panels. The coatings after being baked at 200° C. for a short period are hard and durable.

We claim as our invention:

1. A rosin acid ester of pentaerythritol tri(tert-butyl-benzoate).

2. A completely esterified rosin acid ester of poly(allyl alcohol) having at least 5 and not more than 12 hydroxyl groups, hydroxyl groups, 10% to 80% of which are esterified with a tert-alkyl substituted benzoic acid wherein the tert alkyl radical contains from 4 to 16 carbon atoms.

3. A completely esterified mixed rosin acid ester of a polyhydric alcohol of the group consisting of glycerol, polyglycerol, pentaerythritol, polypentaerythritol, and mannitol, having from 10% to 80% of the hydroxyl groups esterified with a tert-alkyl substituted benzoic acid wherein the tert alkyl radical contains from 4 to 16 carbon atoms.

4. A completely esterified mixed ester of a polyhydric alcohol of the group consisting of glycerol, polyglycerol, pentaerythritol, polypentaerythritol, and mannitol, having from 10% to 80% of the hydroxyl groups esterified with a tert-alkyl substituted benzoic acid wherein the tert-alkyl radical contains from 4 to 16 carbon atoms and substantially all of the remaining hydroxyl groups esterified with a rosin acid.

5. A completely esterified mixed ester of an aliphatic polyhydric alcohol made up only of the elements carbon, hydrogen and oxygen and containing from 3 to 12 hydroxyl groups having at least one of the hydroxyl groups esterified with a tert-alkyl substituted benzoic acid wherein the tert-alkyl radical contains from 4 to 16 carbon atoms, and having the remaining hydroxyl groups esterified with a rosin acid.

6. A coating composition containing a cellulose derivative of the group consisting of cellulose nitrate, cellulose acetate, cellulose propionate, cellulose stearate, cellulose valerate, ethyl cellulose, methyl cellulose, butyl cellulose, benzyl cellulose, glycol cellulose, cellulose acetostearate, and cellulose acetotartarate and a rosin acid ester of pentaerythritol tri(tert-butyl-benzoate).

7. A coating composition containing a cellulose derivative of the group consisting of cellulose nitrate, cellulose acetate, cellulose propionate, cellulose stearate, cellulose valerate, ethyl cellulose, methyl cellulose, butyl cellulose, benzyl cellulose, glycol cellulose, cellulose acetostearate, and cellulose acetotartarate and a completely esterified rosin acid ester of a pentaerythritol having from 10% to 80% of the hydroxyl groups esterified with a tert-alkyl substituted benzoic acid wherein the tert-alkyl radical contains from 4 to 16 carbon atoms.

8. A coating composition containing a cellulose derivative of the group consisting of cellulose nitrate, cellulose acetate, cellulose propionate, cellulose stearate, cellulose valerate, ethyl cellulose, methyl cellulose, butyl cellulose, benzyl cellulose, glycol cellulose, cellulose acetostearate, and cellulose acetotartarate and a completely esterified mixed ester of a polyhydric alcohol made up only of the elements carbon, hydrogen and oxygen and containing from 3 to 12 hydroxyl groups having at least one of the hydroxyl groups esterified with a tert-alkyl substituted benzoic acid wherein the tert-alkyl radical contains from 4 to 16 carbon atoms, and having the remaining hydroxyl groups esterified with a rosin acid.

References Cited in the file of this patent

UNITED STATES PATENTS

| Number | Name | Date |
|---|---|---|
| 2,015,145 | Hubbach | Sept. 24, 1935 |
| 2,110,072 | Alvarado | Mar. 1, 1938 |
| 2,160,532 | Barrett | May 30, 1939 |
| 2,440,242 | Auer | Apr. 24, 1948 |
| 2,448,520 | Cuprey | Sept. 7, 1948 |
| 2,558,025 | Wicks | June 26, 1951 |